INVENTOR.
Joseph J. Overzat
BY
Ralph L Chappell
ATTORNEY.

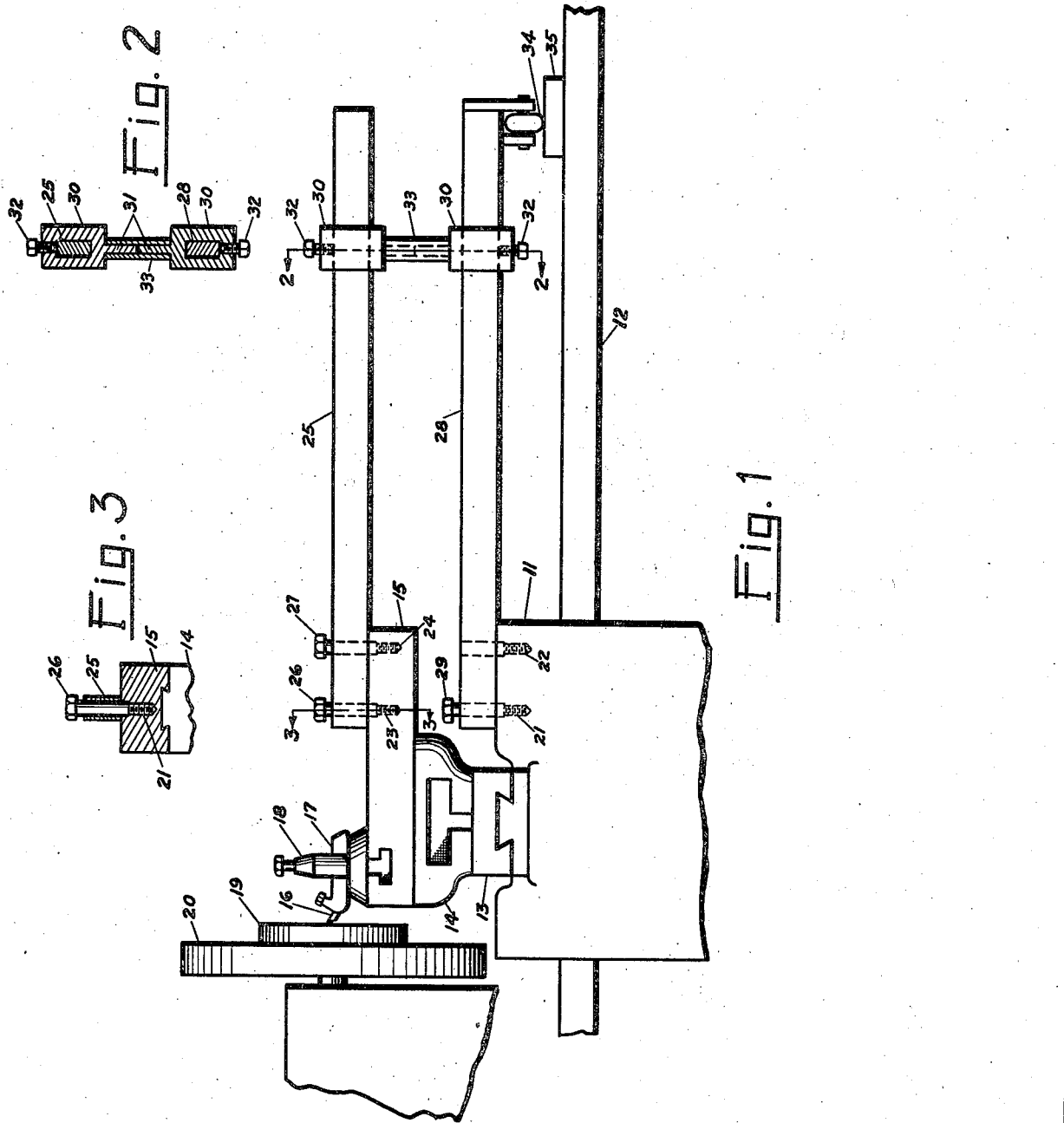

Patented Sept. 9, 1947

2,427,020

UNITED STATES PATENT OFFICE 2,427,020

LATHE FIXTURE

Joseph J. Overzat, New York, N. Y.

Application March 10, 1945, Serial No. 582,096

4 Claims. (Cl. 82—11)

(Granted under the act of March 3, 1883, as amended April 30, 1928; 370 O. G. 757)

This invention relates to a lathe fixture for turning or shaping concave and convex surfaces.

An object of this invention is to provide a fixture which may be readily attached to a lathe to permit turning of convex or concave surfaces of an infinite variety of radii.

Another object is to provide a fixture readily attachable to a lathe to permit turning of convex and concave surfaces of identical radius.

Still another object is to provide a readily attachable spherical surface turning lathe fixture which may be readily converted from turning convex surfaces to turning concave surfaces of equal or unequal radii, and vice versa.

In the drawings:

Fig. 1 is a side view in elevation of the fixture mounted on a lathe.

Fig. 2 is a vertical section through the fixture along the line 2—2 in Fig. 1.

Fig. 3 is a vertical section along the line 3—3 in Fig. 1.

Figure 4:
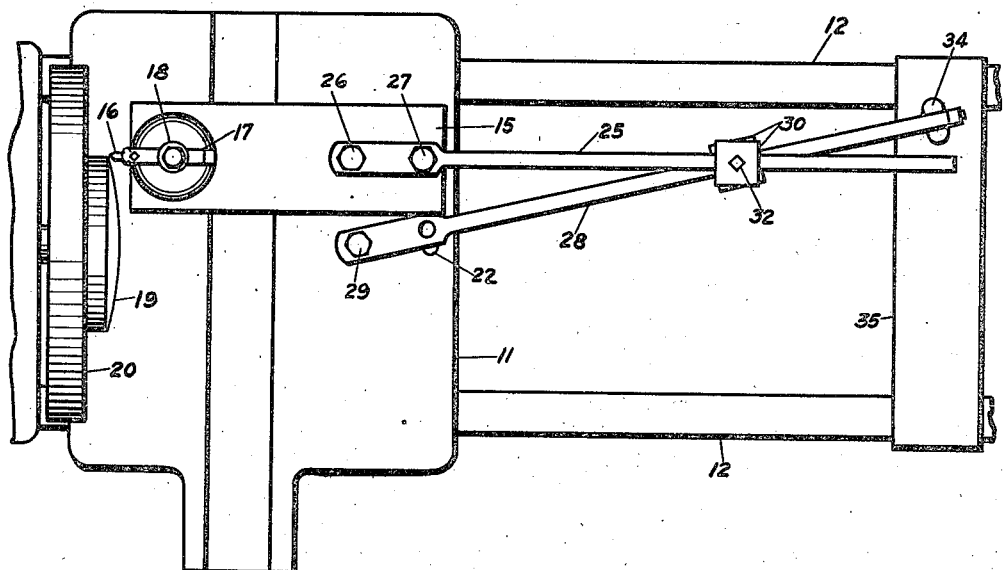
Fig. 4 is a top view of the fixture mounted on a lathe with the fixture adjusted to turn convex surfaces of a desired radius.

In the drawings, 11 indicates a lathe carriage resting on a lathe bed 12. On carriage 11 are mounted a compound rest base 13, compound rest swivel 14 and compound rest top 15. A cutting tool 16 is carried in a tool holder 17 and is held by the tool post 18 against the work, illustrated as block 19, which is centered in the chuck 20.

The fixture constituting the subject of this invention may be attached to the lathe by bolting, welding, clamping or in any other suitable manner, as desired. As illustrated in the drawings, lathe carriage 11 is provided with two internally threaded bolt holes 21 and 22, whose center lines lie directly beneath the center line of the lathe. The compound rest top 15 is provided with two similar internally threaded bolt holes 23 and 24, whose center lines are in line with the longitudinal axis of the compound rest top 15.

An arm 25 is secured to the compound rest top 15 by the machined pin-bolts 26 and 27 and a similar arm 28 is secured to the carriage 11 by a machined pin-bolt 29. The machined pin-bolts 26, 27, and 29 fit snugly in machined holes drilled in the arms 25 and 28 and said pin-bolts are end threaded so that they may be interchangeably screwed into the threaded bolt holes 21, 22, 23 and 24. Embracing arms 25 and 28 in an adjustable relationship are two inter-related collars 30, each of which is provided with a spindle 31 and a set screw 32 (see Fig. 2). The spindles 31 are adapted to abut each other, and are held in alignment by a sleeve 33. The arm 28 is preferably provided at its outer end with a depending roller 34 for outer support of said arm, which roller rests upon a level plate 35 suitably mounted on the bed 12.

The operation of the fixture is as follows. The compound rest swivel 14 is initially fixed in position so that the compound rest top 15 may move relatively to it only in a direction parallel to the center line of the lathe. The cutting edge of the cutting tool 16 is then adjusted in relation to the work block 19, so that it is fixed to operate at the horizontal level of the center of the block 19. In preparation for turning convex surfaces, the arm 25 is then fixedly attached to the compound rest top 15 by the two machined pin-bolts 26 and 27, which are screwed into bolt holes 23 and 24 respectively. The arm 28 is secured to the lathe carriage 11 by a single machined pin-bolt 29 screwed into the bolt hole 21. The radius to be cut is then determined by sliding the assembled collars 30 along the arms 25 and 28 and locking them in place at the position desired by means of the set screws 32. The radius to be cut is measured in this instance from the center line of the pin-bolt 29 to the center line of the collars 30, which is also the center line of the spindles 31 and the set screws 32. Sleeve 33 retains the spindles 31 in axial alignment and both are independently free to be rotated about their common axis.

Feeding the compound across the rotating work results in the turning of a desired convex surface on the work-piece 19. Arm 25 is fixedly attached with relation to the compound rest top 15 by the pin-bolts 26 and 27, whereas the arm 28 is free to rotate about the pin-bolt 29. The arms 25 and 28 are free to oscillate relative to each other about the common axis of the spindles 31. The travel of the compound rest across the work 19 results in the arm 28 rotating about the pin-bolt 29 and in a reciprocative movement of the compound rest top 15 parallel to the center line of the lathe. In other words, the spindles 31 are caused to describe an arc about the pin-bolt 29, and the cutting tool 16 is thereby caused to describe a similar arc of the same radius across the work, the movement being translated through the medium of the fixedly attached arm 25 (see Fig. 4).

Figure 5:
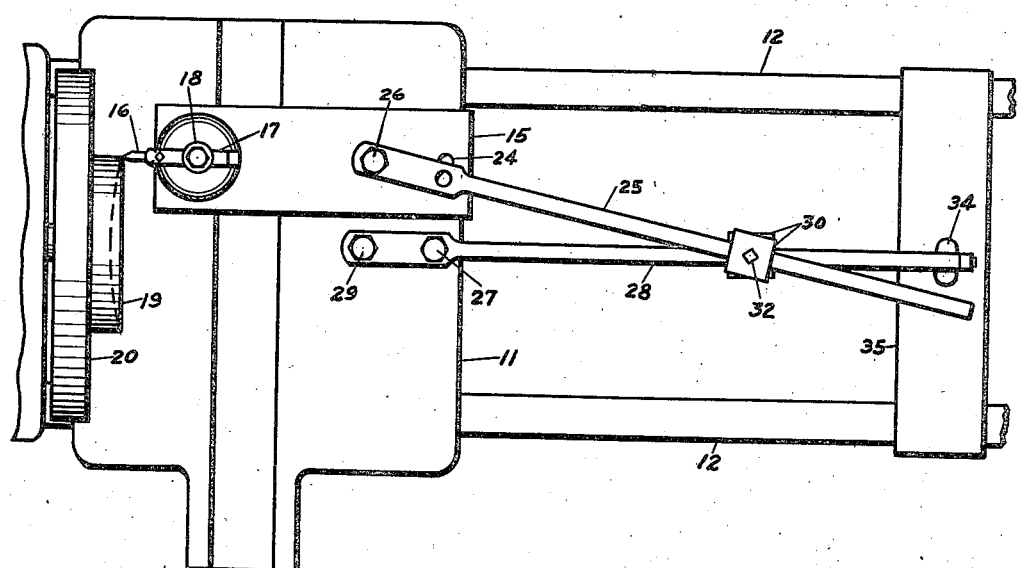
Fig. 5 is a top view of the fixture mounted on a lathe with the fixture adjusted to turn concave surfaces of a desired radius.

To convert the fixture to machine a concave surface, it is necessary only to remove the pin-bolt 27 from the bolt hole 24 and the arm 25, and insert it through the arm 28 into the bolt hole 22. This results in the arm 28 now being fixedly attached with relation to the carriage 11 by the pin-bolts 29 and 27, whereas the arm 25 is now free to rotate about the pin-bolt 26 (see Fig. 5). Movement of the compound across the work in this case results in the arm 25 rotating about the pin-bolt 26.

The arm 25 also oscillates about the axis of spindles 31 resulting in the pin-bolt 26 describing an arc about the spindles 31. The pin-bolt 26 being secured in bolt hole 23, a reciprocative movement parallel to the center line of the lathe is translated to the compound rest top 15 and to the cutting tool 16, resulting in the turning of a concave surface.

The fixture of this invention may be easily and quickly converted from turning convex surfaces to turning concave surfaces, and vice versa, by simply removing a single pin-bolt and replacing it in another position. To maintain a constant radius of curvature in successive pieces of work is an inherent function of the device, while the collars 30 by means of the set screws 32 permit quick and simple change of the radius of curvature to an infinite number of values. The highest value of radius of curvature which may be utilized is limited only by the length of the arms 25 and 28, which may be as long as desired. Very small radii of convex or concave curvature may be achieved by screwing the pin-bolts 26 and 29 into the bolt holes 22 and 24, and utilizing one or the other of the bolt holes 23 or 21, as the case may be, for the arm locking pin-bolt 27. Thus, the axis of the rotational pin-bolt is brought as close as possible to the axis of the collars 30.

The fixture of this invention may be easily and quickly affixed to or removed from a lathe, by merely screwing three pin-bolts into bolt holes provided to receive them, or by removing three pin-bolts. The fixture may be made attachable by clamps or by any other suitable device, or may be made an integral part of the lathe, as desired. Should the arms 25 and 28 be long or heavy, or both, they may be supported by the roller 34 mounted at the outer end of the arm 28 and riding upon the lever plate 35. The arm 25 is also supported thereby through the spindles 31 and the sleeve 33.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a lathe having a carriage, a cross-slide freely, slidably mounted on the carriage, a fixture therefor for turning convex and concave surfaces comprising an arm adapted to be attached to said carriage and an arm adapted to be attached to said cross slide, one of said arms being fixedly attached and the other being rotatably attached, and means securing said arms together and holding said arms in fixed relation but permitting oscillatory motion relative to each other about a common axis.

2. In a lathe having a carriage, a cross-slide freely, slidably mounted on the carriage, a fixture therefor for turning convex and concave surfaces comprising an arm adapted to be attached to said carriage and an arm adapted to be attached to said cross slide, one of said arms being fixedly attached and the other being rotatably attached, and adjustable means slidably enclosing both arms to secure said arms together and hold them in fixed relation with each other but permitting oscillation relative to each other about a common axis.

3. In a lathe having a carriage, a cross-slide freely, slidably mounted on the carriage, a fixture therefor for turning convex surfaces comprising an arm adapted to be rotatably attached to said carriage and an arm adapted to be fixedly attached to said cross slide, and means securing said arms together and holding said arms in fixed relation but permitting oscillatory motion relative to each other about a common axis.

4. In a lathe having a carriage, a cross-slide freely, slidably mounted on the carriage, a fixture therefor for turning concave surfaces comprising an arm adapted to be fixedly attached to said carriage and an arm adapted to be rotatably attached to said cross-slide, and means securing said arms together and holding said arms in fixed relation but permitting oscillatory motion relative to each other about a common axis.

JOSEPH J. OVERZAT.

REFERENCES CITED

The following references are of record in the file of this patent:

UNITED STATES PATENTS

| Number | Name | Date |
|---|---|---|
| 306,525 | Roberts | Oct. 14, 1884 |
| 332,578 | Warrall | Dec. 15, 1885 |
| 1,291,011 | Johnsson | Jan. 14, 1919 |
| 2,364,977 | Hendel | Dec. 12, 1944 |